United States Patent [19]

Smith et al.

[11] 4,160,178

[45] Jul. 3, 1979

[54] METHOD OF COATING AN ARTICLE WITH A SOLVENTLESS ACRYLIC EPOXY IMPREGNATING COMPOSITION CURABLE IN A GAS ATMOSPHERE WITHOUT HEAT

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 911,577

[22] Filed: Jun. 1, 1978

[51] Int. Cl.² .......................... H02K 1/04; B32B 15/08
[52] U.S. Cl. ..................................... 310/43; 427/104;
427/116; 427/118; 427/377; 427/386; 174/120 SR; 174/121 SR; 310/45; 310/208; 336/96; 428/475.8; 428/475.1; 428/476.3; 428/476.9; 428/537; 428/413; 428/417; 428/418; 428/454; 428/463; 428/475; 428/532; 428/476; 525/108; 428/443; 525/119; 428/480; 428/514; 428/522; 428/913
[58] Field of Search ............... 428/418, 463, 454, 413, 428/913, 474, 417, 537, 532, 443, 480, 514, 522; 260/836, 837 R; 310/43, 45, 208; 174/120 SR, 121 SR; 336/96, 205; 427/104, 116, 117, 118, 377, 386

[56] References Cited

U.S. PATENT DOCUMENTS

| | | | |
|---|---|---|---|
| 3,539,438 | 11/1970 | Groff | 428/463 |
| 3,616,040 | 10/1971 | Toback | 428/463 |
| 3,634,379 | 1/1972 | Hauser | 428/463 |
| 3,737,988 | 6/1973 | Bednarski | 310/43 |
| 3,986,546 | 10/1976 | Green | 264/83 |
| 3,987,019 | 10/1976 | Gruber | 428/463 |
| 4,007,322 | 2/1977 | House | 428/463 |
| 4,034,145 | 7/1977 | Gruber | 438/463 |

OTHER PUBLICATIONS

*Chem. Abstracts,* 81 (No. 8), 50530r, 50659q and 50660h, (1947).
*Chem. Abstracts,* 81 (No. 5), 26474e, (1974).
*Chem. Abstracts,* 82 (No. 16), 112858k, (1975).
*Chem. Abstracts,* 81 (No. 14), 78994u (1947).

*Primary Examiner*—Ellis P. Robinson
*Attorney, Agent, or Firm*—D. P. Cillo

[57] ABSTRACT

Resins, made by admixing polyacrylic resin and epoxy resin in a weight ratio of polyacrylic:epoxy of 10:0.1 to 100 are cured in a diffusion gas atmosphere. An insulated conductor is coated with the polyacrylic-epoxy resin and cured without heat in a contacting gas atmosphere, such as nitrogen, carbon dioxide, argon, helium, methane, or hydrogen.

18 Claims, 6 Drawing Figures

METHOD OF COATING AN ARTICLE WITH A SOLVENTLESS ACRYLIC EPOXY IMPREGNATING COMPOSITION CURABLE IN A GAS ATMOSPHERE WITHOUT HEAT

BACKGROUND OF THE INVENTION

Conductors, for use as coils in generators and motors, are usually insulated by a vacuum-pressure impregnation process. This involves wrapping the conductors with mica tape, and then with a glass binding tape to hold the mica tape on. The wrapped conductor is then placed in a vacuum, with an impregnating resin under pressure. As a last step, the wrapped, impregnated conductor is removed, and heated in an oven to cure the resin.

While this system is used commercially, it requires a great deal of energy for the baking ovens, because the copper in the coils and the iron in the stator frame must be heated along with the resin. Run-off of the resin during cure can occur, and mechanical stresses in the resin can be induced by expansion of the copper during cure and its subsequent contraction during cooling. In many instances, the solvent evaporated during heating contributes to air pollution.

Anaerobic resins are resins which will not cure in the presence of oxygen. Some resins are described as "anaerobic" because they will cure when placed between two oxygen-impervious metal surfaces. These types of resins are commonly used in adhesives. Groff, in U.S. Pat. No. 3,539,438 discloses wrapping a conductor with mica paper and impregnating it with an acrylic resin. Anaerobic type acrylic resins, mixed with peroxy initiators, are disclosed by Toback, in U.S. Pat. No. 3,616,040, for use in adhesive bonding of surfaces, when placed in contact with and between nonporous substrates, generally made of metal. Anaerobic type all acrylic resins have been found to present some problems of shrinkage upon cure, to lack complete thermal stability at high temperatures, and to have only moderately good electrical properties upon cure.

Vogel et al. have developed one component anaerobic-epoxy metal adhesives, based on epoxy resin diacrylates, alkyl or glycol methacrylates, amine accelerators and hydroperoxide initiators, as disclosed in 81 *Chemical Abstracts*, No. 8, 50530r; 50659q; and 50660h (1974). Izao et al., in 81 *Chemical Abstracts*, No. 5, 26474e (1974), and Takiyama et al., in 82 *Chemical Abstracts*, No. 16, 112858k (1975), formulated anaerobic-epoxy adhesive materials, by precooking epoxy resins with acrylic containing reactive species and subsequently blending in acrylic monomer, amine accelerator, and peroxide initiator. Green, in 81 *Chemical Abstracts*, No. 14, 78994u (1974), synthesized acryloyloxy and methacrylolyloxyhydroxypropylethers as precursors for anaerobicepoxy metal adhesive compositions. These adhesive systems have depended primarily on metal catalyzed cure from the bonding surfaces, rather than cure through oxygen displacement by means of a diffusion gas.

What is needed is a resin system useful for coating and potting electrical conductors, and for coating and vacuum impregnating mica insulated high voltage electrical coils; where the resin system can be cured by a room temperature method, in an oxygen-free gaseous environment, by an oxygen displacement curing mechanism, rather than metal catalysis requiring metal contact with the resin. The resin system should have low shrinkage during cure, good electrical characteristics, i.e., power factor and dielectric constant, good thermal stability, high bond strength with mica, and most importantly, the ability to deep cure without heating.

SUMMARY OF THE INVENTION

We have found that insulated conductors, coated with a certain resin system, containing polyacrylic resins and epoxy resins in a weight ratio of polyacrylic:epoxy of 10:0.1 to 100, will not cure in a normal vacuum of about 4 mm. of Hg, but can be deep cured without heating, by contact with a non-oxygen containing gaseous atmosphere. The resin always contains dissolved oxygen, and in the method, a gaseous atmosphere is used which will permeate the resin and displace the dissolved oxygen, allowing a non-oxygen cure mechanism to proceed. Permeation of the resin is effected by pressure or gas flow across the resin surface.

This method of cure means that the resin can be cured at room temperature, thus avoiding the problems previously encountered with heat-cured resins, particularly resin "run-off-38 from coils and stators. Electrical properties are generally comparable to the heat-cured resins now in use. Unlike electron beam, metal catalysis and UV cured resins, anaerobic resins can be deep gas cured in depths to 6 inches or more, and so are extremely useful in coating and potting transformers. Following cure, they can optionally be post cured in an oven if desired.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
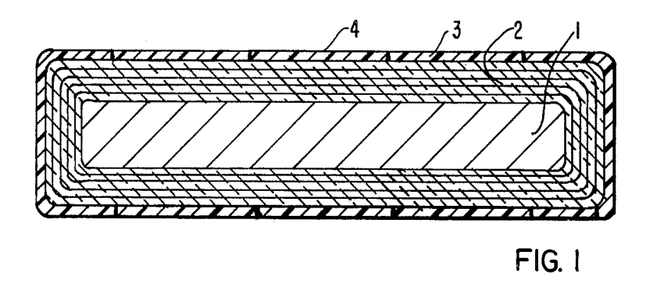
FIG. 1 is a cross-sectional view of an insulated conductor impregnated with resin.
Figure 2:
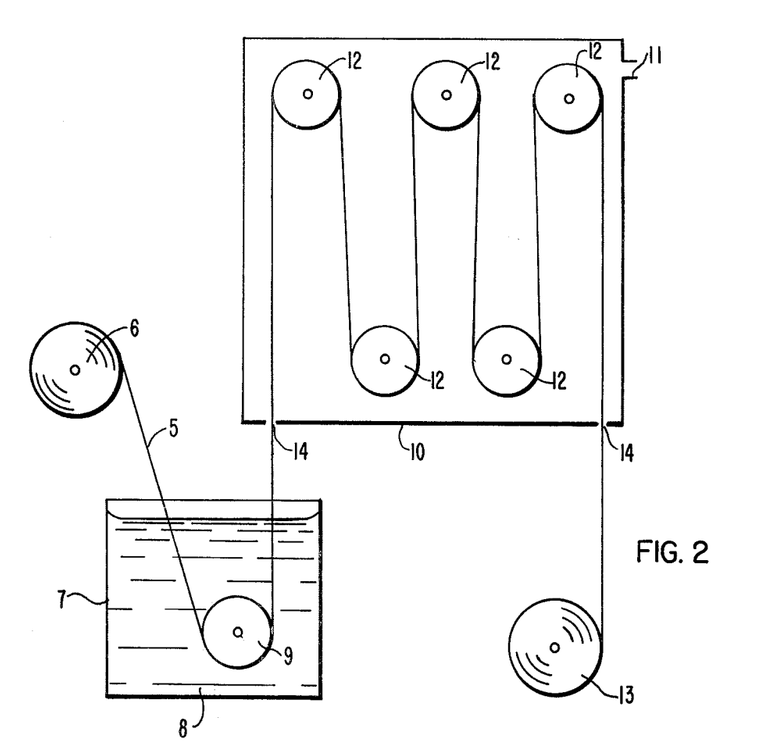
FIG. 2 is a diagram of one embodiment of an apparatus for continuously coating a wire using the curing system of the invention.

Referring to FIG. 1, a conductor 1 is covered with several layers of mica tape insulation 2 and one layer of woven organic tape insulation 3, which holds the mica insulation in place. Resin 4 impregnates the insulation and forms an outer coating. In FIG. 2, a conductor 5 passes from capstan 6 into bath 7 of resin 8. The wire then passes over sheave 9 into closed tank 10 from which the air has been evacuated. An inert gas flows into the tank from conduit 11, contacting the resin in a manner effective to displace oxygen dissolved in the resin. As the wire passes over sheaves 12 in the tank it is cured, then leaves the tank and is wound on capstan 13. Escaping inert gas at 14 would prevent excess entry of air.

The resin of this invention is a resin which will not cure in the presence of the oxygen dissolved therein. However, it is capable of gas penetration, and will deep cure, in the method of this invention, at room temperature, when placed in an oxygen free environment containing a gas effective to displace the dissolved oxygen. By "deep cure" is meant, curing to a solid state to depths of about 6 inches Solventless resins of this type would be very useful for vacuum-pressure coating-impregnation processes.

The insulating resins used in the method of this invention contain aliphatic polyacrylics such as diacrylate and triacrylate resins, which polymerize by addition through a double bond. Commonly used polyacrylic resins include tetraethylene glycol dimethacrylate and tetraethylene glycol diacrylate. The insulating resin may also contain aliphatic monoacrylic resins such as ethyl acrylate and aromatic, reactive vinyl monomers such as styrene. Well known organic peroxide free radical initiators, such as cumene hydroperoxide or t-butyl perbenzoate are used to help initiate cure. Well known, organic, free radical accelerators, usually tertiary amines such as N,N-dimethyl-p-toluidine, and an organic co-accelerator, usually an organic sulfimide such as benzoic sulfimide, may be present to reduce curing time. The free radical initiator is stabilized with a free radical stabilizer such as hydroquinone or parabenzoquinone. A variety of epoxy resins are used as necessary ingredients in this invention, and are critical to provide improved electrical, curing, shrinkage and high temperature stability properties.

Although the chemistry of the resins used in the method of this invention is very complex, and not completely understood at this time, it is believed that the unique characteristics of the material of this invention is linked to the tendency for an organic peroxide, i.e., hydroperoxide or perester, to be stabilized in an oxygen-rich atmosphere, or by dissolved oxygen in the resin itself:

An equilibrium is attained between the organic peroxide free radical initiator and its decomposition products in an air or an oxygen-containing environment. Presumably, the small amounts of free radicals produced under these conditions are "quenched" or stabilized by organic reaction inhibitors such as hydroquinone or parabenzoquinone. However, when the equilibrium is moved to the right, i.e., by decreasing the oxygen content, such as displacement by $N_2$, the concentration of free radicals will increase sharply and the inhibitor is no longer able to quench all of them.

At some critical point, the peroxide radicals or their by-products will begin to initiate polymerization, by adding to the acrylic resin or aromatic vinyl monomer. The function of accelerators or co-accelerators would be to speed up the rate of decomposition of the organic peroxide, thereby giving a faster gelation time for the impregnants. The gaseous atmosphere, i.e., nitrogen, carbon dioxide, argon, helium, methane or hydrogen, functions as a resin permeable cure initiator.

The resins used in this invention contain a variety of critical components which allow a chain reaction mechanism to proceed, resulting in deep resin cure. Without using heat or metal catalysis, reaction kinetics and component interaction are of prime importance in cure. All resin systems contain small quantities of dissolved $O_2$, due to $O_2$ permeation from the atmosphere i.e., about 1.0 to 10 volume %. A normal vacuum of about 3 to 5 mm. of Hg will not remove this $O_2$ to a level of below about 0.5 volume %, which is required in the method of this invention. A vacuum of below 1 mm. of Hg might remove the dissolved $O_2$ but would also probably eliminate some required reactive species, and is commercially unfeasible.

Although the reaction mechanism is not completely understood at this time, it is thought that the $O_2$ dissolved in the resin acts as a co-reaction inhibitor with the hydroquinone, or other useful organic reaction inhibitor, which is present in the formulation of this invention, in amounts effective to act as a free radical reaction inhibitor. When a non-oxygen containing gas, which is soluble in the resin, and which is capable of permeating the resin and by some means displacing and forcing the dissolved $O_2$ from the resin, is passed over the resin or pressure forced into the resin, then a cure mechanism typified by this invention can proceed.

Suitable diffusion gases, i.e., gases that are soluble in the resin and effective to permeate the resin and displace substantially all of the dissolved $O_2$ therein, are preferably, argon, helium, carbon dioxide, methane, hydrogen and nitrogen. By "displace" is meant removal of oxygen to a level below about 0.5 volume % i.e., below about 0.5 volume % $O_2$ and the chain reaction cure will proceed between the combination of ingredients in the resin. Argon, helium and carbon dioxide are the most effective to displace $O_2$, but nitrogen is preferred because it is commercially available in pure form free of moisture. Of course, other gases or gas mixtures effective to act as defined above can be used. It is also possible that these diffusion gases might in some way interact with some components of the resin formulation to push the reaction to polymerization.

Once the dissolved $O_2$ has been removed from the resin, it is thought that the reaction stabilizer or inhibitor, hydroquinone, lacking its $O_2$ inhibiting partner, cannot trap enough free radicals to neutralize reaction, and a chain of events starts to drive the polymerization reaction. It is thought that in the stable state with $O_2$ present, the free radical initiator, such as a peroxide, forms a stable, charge-transfer complex with the free radical accelerator, such as a tertiary amine. Upon loss of $O_2$ from the resin, the co-accelerator, such as sulfimide, interacts with the complex, to activate it, and initiate decomposition of free radical initaitor, such as peroxide. This in turn promotes acrylic and vinyl polymerization i.e., the propagation step, and drives the reaction and cross linking to completion and cure.

Thus, it is thought that there is a complex interaction between all of the components present in the formulation of this invention. The free radical initiator must be present in an amount effective to initiate acrylic or vinyl monomer cross linking or polymerization. The free radical accelerator must be present in an amount effective to activate the peroxide to form a complex. The free radical co-accelerator must be present in an amount effective to cause decomposition of the peroxide free radical initiator, and the reaction stabilizer or inhibitor must be present in an amount effective to prevent peroxide decomposition when $O_2$ is present in the resin.

Some metals, such as copper and iron, have been used in the prior art to initiate the decomposition of the peroxide catalyst. These types of "anaerobic" resins then surface cure between metal surfaces, not specifically because the surfaces exclude oxygen, but because the metal catalyzes the formation of free radicals. Resins placed between metal surfaces are cured to a depth of about one-eighth of an inch, because the metal only decomposes the peroxides it contacts. In the method of this invention, oxygen is evacuated from a container where the resin coated article is placed. Then the non-oxygen containing gas, such as nitrogen, is introduced under pressure or as a flow of gas. The gas contacts the resin, actually diffuses throughout the resin, due to the flow or pressure, and shifts the equilibrium in favor of free radical formation, due to oxygen displacement, so that deep cures, to depths of six inches or more, can be readily achieved. Metal plate or other metal contact over the resin surface to provide metal catalysis is not required or desirable in this invention.

The solventless impregnants used to coat articles in this invention should have extremely useful and widespread applications within the electric industry. One of the obvious advantages of this method is that these impregnants would not require any heat treatment to gel. This would offer the possibility of eliminating baking ovens in the curing method thereby reducing capital expenditures and saving valuable floor space in manufacturing plants. Also, heat energy and hence fuel costs would be drastically curtailed.

Other notable advantages of this method would be lower resin "run-off" from coils and stators, reduced air pollution arising from volatile substances in the curing oven, and the elimination of damaging mechanical stresses sometimes found in the manufacture of larger coils and stators, from copper expansion effects during the heat treatment of resins.

The polyacrylic-epoxy resins of this invention can be formulated to have viscosities as low as 1 cps., making them uniquely applicable for coating and impregnation of multiple layered mica insulated high voltage coils. These resins can be formulated for use as wire enamel resins. These polyacrylic-epoxy resins can also find particularly useful application as insulating potting resins for transformers and insulating casting resins for bushings which may be used in power circuit breakers, since they can be deep cured to 6 or more inches without requiring heat. Following cure by the static, pressurized, or flowing diffusion gas, the resins can be optionally post-cured in an oven for up to 48 hours at 100° C. to 175° C. In most instances the electrical properties of the diffusion gas cured resins are more than adequate, and post-curing is not necessary, due to inert gas contact in a manner effective to displace oxygen dissolved in the resin, causing cure initiation.

The polyacrylic-epoxy resin will be discussed primarily for use in an impregnating process, but it is to be understood that its use is not so limited. As shown in FIG. 1, the conductor 1 is preferably copper because it is most widely used for electrical insulation although other metals such as aluminum or silver can also be used. The primary insulation is preferably mica, especially for high voltages, as it has excellent electrical properties. Glass, asbestos, polyester, Nomex, a polyamide believed to be made from meta phenylene diamine and isophtaloyl chloride, and other types of insulation could also be used, either alone, in mixtures, or in mixtures with mica.

Mica insulation is usually made with a polyester fabric backing to hold the mica together. The insulation may be a tape which is wrapped around the conductor, the amount of insulation depending upon the voltage drop across the insulation. The mica insulation is preferably impregnated with about 3% to 30%, preferably about 5% to about 12%, by weight based on the mica insulation weight, of a separate polymer which is co-reactive with the impregnated resin, in order to insure a better bond, such as polyesters, acrylics, polybutadienes, and the like.

The insulating resin used in this invention is a new and much improved composition consisting of a critical mixture of ingredients. The resin comprises an admixture of aliphatic, poly (di or tri) acrylic resin:aliphatic, monoacrylic resin:epoxy resin:aromatic reactive vinyl monomer: anhydride in a weight ratio of from about 10:0 to 20:0.1 to 100; 0 to 120:0 to 60. This resin also contains, for a weight ratio of 100 parts insulating resin:0.001 to 1 part free radical stabilizer:0.001 to 10 parts organic free radical initiator:0.01 to 10 parts organic free radical accelerator, and: 0.01 to 10 parts organic co-accelerator. In the composition of this invention, it is essential that the resin is capable of gas penetration and that major amounts of epoxy resin be present, along with minimal amounts of the essential di or tri acrylic resin, in order to have improved, electrical, shrinkage and high temperature properties.

Polyacrylic resins that are essential in the insulating resin of this invention are selected from the group of aliphatic, organic diacrylates such as, for example, tetraethylene glycol dimethacrylate, tetraethylene glycol diacrylate, hexamethylene glycol dimethacrylate, neopentyl glycol diacrylate, neopentyl glycol dimethacrylate, hexamethylene glycol diacrylate, ethylene glycol dimethacrylate, trimethylene glycol diacrylate, bisphenol A dimethacrylate and the like, and aliphatic, organic triacrylates such as, for example, trimethylol propane triacrylate and the like, and their mixtures. The preferred acrylic resin is tetraethylene glycol dimethacrylate.

Aliphatic, monoacrylic resins and aromatic, reactive vinyl monomers can optionally be used with the polyacrylics and epoxies. Those particularly useful in the insulating resin of this invention are, for example, effective amounts of organic aliphatic monoacrylates, such as ethyl acrylate, 2-ethyl acrylate, 2-ethylhexyl acrylate, ethyl methacrylate, glycidyl methacrylate, allylmethacrylate and the like, vinyl acids such as acrylic acid, methacrylic acid and the like, and organic, aromatic, reactive vinyl monomers, such as vinyl pyridine, vinyl toluene, tertiary butyl styrene, styrene and the like. The preferred monoacrylics and reactive vinyl monomers are ethyl methacrylate, 2-ethylhexyl acrylate and styrene. The weight ratio of acrylic, i.e., diacrylate or triacrylate:aliphatic monoacrylate:aromatic vinyl monomer is between about 10:0 to 20:0 to 120, i.e., as high as 20 parts monoacrylate and 120 parts reactive vinyl monomer per 10 parts acrylic, with a preferred ratio of between about 10:2.5 to 10:2.5 to 40. These materials act as reactants and diluents for the polyacrylics and epoxy resin.

The epoxy resins essential to the new and improved resins of this invention include glycidyl polyethers whose principal structure may be represented by the chemical formula:

where n is an integer of the series 0, 1, 2, 3 . . . , and R represents the divalent hydrocarbon radical of the dihydric phenol. Typically R is:

to provide a diglycidyl ether of bisphenol A type epoxide or to provide a diglycidyl ether of bisphenol F type epoxide resin.

The bisphenol type epoxy resins used in the invention have a 1, 2 epoxy equivalency greater than one. They will generally be diepoxides. By the epoxy equivalency, reference is made to the average number of 1, 2 epoxy groups, contained in the average molecule of the glycidylether. Typicallyy, epoxy resins of bisphenol are readily available in commercial quantities and reference may be made to *The Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. The product of the reaction is generally a massive oxidation resistant aromatic compound, one example of which is represented by the chemical structural formula:

wherein n is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis[p-(2,3-epoxypropoxy)phenyl]-methane. These resins are well known in the art and reference may be made to *The Handbook of Epoxy Resins* for a complete description of the their synthesis. Other useful epoxy resins include glycidyl esters, hydantoin epoxy resins, cycloaliphatic epoxy resins and diglycidyl ethers of aliphatic diols.

The glycidyl ester epoxy resins which can be employed in this invention are non-glycidyl ether epoxy resins containing more than one 1,2 epoxy group per molecule. They are characterized by substitution of the ester bond, for the ether bond, —O—, and have the chemical structural formula:

where R is an organic radical substituent selected from the group consisting of R', R'—O—R', R'—COO—R' and mixtures thereof, where R' is selected from the group consisting of alkylene groups, having from about 1–8 carbon atoms, saturated cycloalkylene groups where the ring has 4 to 7 carbons and mixtures thereof, where n is from about 1-8.

The hydantoin epoxy resins which can be employed in this invention are based on hydantoin, a nitrogen-containing heterocyclic ring having the structure:

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

The cycloaliphatic type epoxy resins employed as the resin ingredient in the invention are selected from non-glycidyl ether epoxides containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH. These resins are well known in the art and reference may be made to Brydson, J., *Plastic Materials,* 1966, 471, for their synthesis and description.

Examples of non-glycidyl ether cycloaliphatic epoxides would include 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexane carboxylate and dicyclopentadiene.

Other useful epoxy resins include diglycidyl ethers of an aliphatic diol having from 2 to 12 carbon atoms. These are low viscosity epoxy resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, and diglycidyl ethers of polyether glycols, such as, for example, diglycidyl ethers of triethylene glycol and diglycidyl ethers of tetraethylene glycol and their mixtures.

All of these epoxy resins can be characterized by reference to their epoxy equivalent weight, which is defined as the mean molecular weight of the particular resin divided by the mean number of epoxy radicals per molecule. In the present invention, all of the suitable epoxy resins will have a preferred epoxy equivalent weight of from about 100 to about 500 with a most preferred range of about 150 to about 250. As mentioned hereinabove, in many instances, an aliphatic monoacrylate, or an organic aromatic reactive vinyl monomer is used as a reactive diluent, co-reactive with the epoxy.

In many instances, organic, carboxylic acid anhydrides reactive with the epoxy, are used in the formulation of this invention. These anhydrides include the conventional organic mono- and poly-functional anhydrides. Typical of the mono-functional anhydrides are hexahydrophthalic anhydride, 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride and the like. Poly-functional anhydrides which may be employed include pyromellitic dianhydride, polyazelaic polyanhydride, the reaction product of trimellitic anhydride and an organic glycol, and benzophenone tetracarboxylic acid dianhydride. These organic anhydrides may be used singly or in admixture.

Free radical reaction initiators particularly useful in the resin of this invention are, preferably, effective amounts of organic peroxides, such as, for example, cumene hydroperoxide, t-butyl perbenzoate, t-butyl hydroperoxide, benzoyl peroxide, 2,5-dimethyl-2,5bis(-benzoylperoxy) hexane and the like. They are well known in the art, and can be used between 0.001 to 10 parts per 100 parts total polyacrylate+monoacrylate+aromatic vinyl monomer+epoxy+anhydride i.e., per 100 parts total insulating resin.

Free radical reaction accelerators, used to initiate cure, which are particularly useful under the cure conditions of this invention are, preferably, organic tertiary amines, such as, for example, N,N-dimethyl-p-toluidine, N,N-diethyl-p-toluidine and the like. They are well known in the art, and can be used between 0.01 to 10 parts per 100 parts total insulating resin.

Free radical reaction co-accelerators, used to reduce curing time, which are particularly useful under the cure conditions of this invention are, preferably, organic sulfimides, such as, for example, benzoic sulfimide and the like. They are well known in the art, and can be used between 0.01 to 10 parts per 100 parts total resin.

Free radical stabilizers, used to stabilize the initiator, particularly useful in the resin of this invention are effective amounts of organic reaction inhibitors such as, for example, hydroquinone, parabenzoquinone, aromatic acidic phenolic compounds such as di-nitrophenols, tri-nitrophenols and picric acid, and the like. They are well known in the art, and can be used between 0.001 to 1 part per 100 parts total resin.

In some instances, latent accelerators may also be used for improving the electrical properties of these resins. These latent catalysts are well known in the art, and a number of them are described in U.S. Pat. Nos. 3,868,613 and 4,020,017, herein incorporated by reference. They include organic quaternary ammonium salts, organic quaternary phosphonium salts, and quaternary organo-tin compounds, among others. Examples of some useful latent catalysts would include, for example, trimethyl ammonium chloride, methyltrioctyl phosphonium dimethyl phosphate, triphenyl tin acetate and the like. They are well known in the art, and can be used between 0.005 to 5 parts per 100 parts total resin.

In the acrylic-epoxy resins of this invention, the components must be added in critical amounts. The weight ratio of diacrylic or triacrylic resin-aliphatic, monoacrylic resin:epoxy resin:aromatic reactive vinyl monomer must range between about 10:0 to 20:0.1 to 100:0 to 120, i.e., 0 to 20 parts monoacrylate, 0.1 to 100 parts epoxy, and 0 to 120 parts aromatic vinyl per 10 parts polyacrylate preferably about 10:2.5 to 10:4 to 75:2.5 to 90. The weight ratio of diacrylic or triacrylic resin component:anhydride can vary between about 10:0 to 60 and preferably between 10:1 to 45. Use of less than about 0.1 part epoxy per 10 parts polyacrylic or over about 60 parts anhydride per 10 parts polyacrylic and there is a loss in tensile, adhesion, shrinkage and electrical properties. Use of over about 100 parts epoxy per 10 parts polyacrylic and there is a loss in the room temperature gel characteristics of the resin system.

The vacuum pressure impregnation process is a is a preferred method of insulating a conductor, because it leaves very few air gaps in the insulation. In this process, the mica tape wrapped conductor is placed in a tank or other type pressure container which is then evacuated to remove oxygen. The resin of this invention is admitted under pressure, usually at least about 45 psi, although about 90 psi to about 100 psi is preferred. The resin should saturate the insulation. Typically, the insulation will contain about 5% to about 35%, by weight based on the insulation weight, of the resin, although about 20% to about 30% is preferred. The resin is then permitted to drain from the wrapped conductor. The resin impregnated insulation then is cured by contact with a gas which does not contain any significant amount of oxygen. This may be accomplished in the same tank or the wrapped conductor may be cured in a separate tank. Oxygen is again evacuated from the tank and the inert gas is fed into the tank. Nitrogen, or carbon dioxide, or mixtures of these two gases are preferred as they are inexpensive, safe, and easy to handle, but other inert gases (other than oxygen) may also be used, such as argon, helium, methane or hydrogen. It has been found that if nitrogen or carbon dioxide are used to cure an acrylic-epoxy resin, the rates of cure are optimum at a continuous inert gas stream flow of about 6 lpm to about 20 lpm (liters per minute). Instead of a gas flow across the insulation, a 20 psi. to 200 psi. static gas pressure can be maintained in a closed tank to cure the resin.

Figure 3:
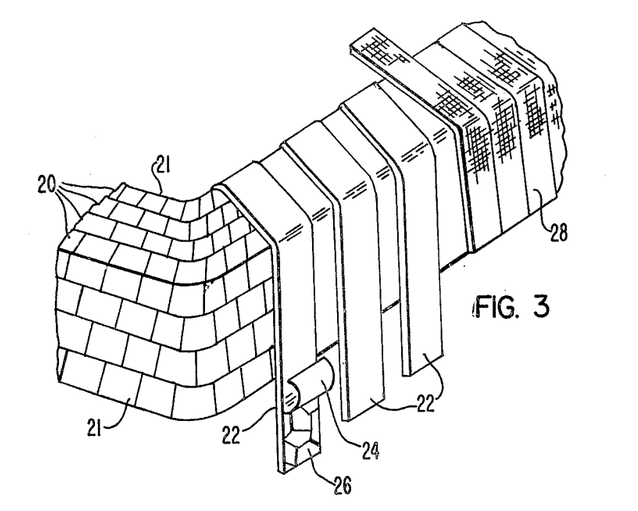
FIG. 3 is a fragmentary view in perspective showing part of a copper coil comprising a plurality of conductors wound with mica tape impregnated with resin.

Referring to FIG. 3 of the drawings, there is illustrated a coil suitable for use in high-voltage electric motors and generators. The full coil would be disposed within the slots of the metal stator surrounding the metal motor armature or generator rotor and could also be used in the armature and rotor slots. The coil comprises a plurality of turns of conductors 20. Each turn of the conductor 20 consists essentially of a copper bar or wire wrapped with insulation 21, such as glass fiber cloth, paper, asbestos cloth, asbestos paper, mica paper, or aramid paper.

The turn insulation is not adequate to withstand the severe voltage gradients that will be present between the conductor and ground when the coil is installed in a high-voltage electrical machine. Therefore, ground insulation for the coil is provided by wrapping plural layers of composite mica tape 22 about the turn 20. Such composite tape 22 can comprise a pliable backing sheet 24 of, for example, polyethylene terephthalate mat, having a layer of mica flakes 26 bonded thereto. The tape may be applied half lapped, abutted or otherwise. Generally, a plurality of layers of the composite tape 22 are wrapped about the coil, with sixteen or more layers generally being used for high voltage coils. In such instances, the resins of this invention are particularly useful, since they can be formulated with viscosities as low as 1 cps. and can be deep cured. To impart better abrasion resistance and to secure a tighter insulation, a wrapping of an outer tape 28 of a tough fibrous material, for example, glass fiber, asbestos or the like may be applied to the coil.

The mica tape 22 for insulating the coils shown in FIG. 3 may be prepared from a sheet backing support material upon which is disposed a layer of mica in the form of integrated flake paper, flakes, splittings, or very fine particle size mica paper. The sheet backing and the mica are contacted and bonded together with the resinous impregnant of this invention. This mica insulation is preferably in the form of a tape of the order of one-half inch to two inches in width, though sheet insulation of any other width may be prepared.

For building electrical machines, such as motors and generators, the sheet backing 24 for the mica may comprise cellulose paper, cotton fabric, linen fabric, asbestos paper, woven glass cloth, glass fibers, or mats or fabrics prepared from nylon, polyester, polyethylene, linear polyethylene terephthalate, polyamide, and aramid fiber or additional mica paper sheets. Sheet backing material of a thickness of approximately 1 mil (0.001 in.), to which there has been applied a layer of from 3 mils to 10 mils thickness of mica has been successfully employed.

Mica flakes are generally about 1/16 inch to ⅜ inch square while mica splittings are generally about ⅜ inch to 3 inches square. Integrated mica flake paper is of compacted mica particles about 1/32 inch to ⅛ inch square and fine mica paper is made of compacted mica particles about 1/64 inch to 1/16 inch square.

The mica tape is wrapped around the coil or other conductor and then is impregnated with the reactive, polymerizable, resinous compositions of this invention, in a vacuum so that there is complete saturation between mica layers. Then, an inert gas is introduced and forced to contact the resin, which upon continued exposure to the penetrating non-oxygen containing atmosphere, will deep cure to provide a thermally stable, tough, cured insulation in the thermoset state. The same pressure container used for impregnation can be used to flow the inert gas or introduce it under 20 psi. to 200 psi. pressure.

Figure 4:
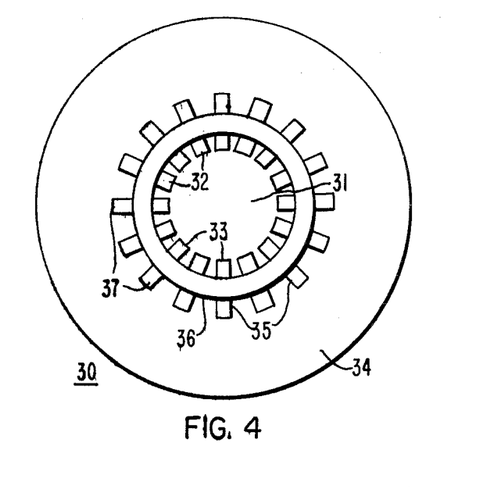
FIG. 4 is a simplified cross-sectional view of one type of a motor containing coils wound with mica tape impregnated with resin.
Figure 5:
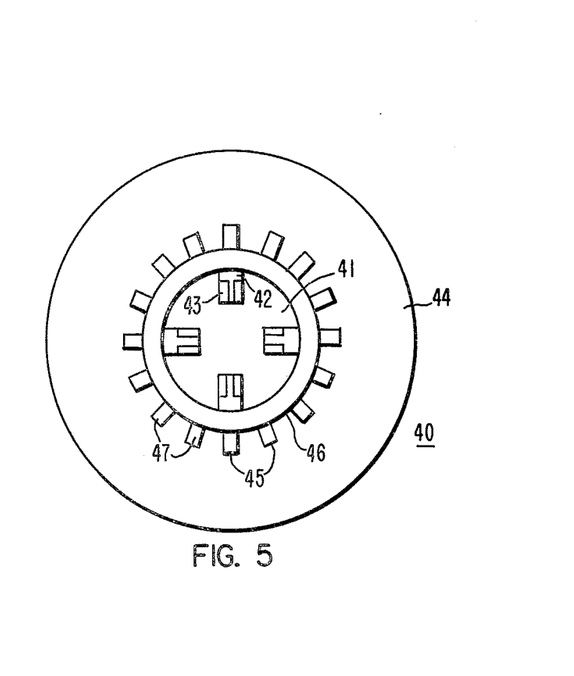
FIG. 5 is a simplified cross-sectional view of one type of a generator containing coils wound with mica tape impregnated with resin.

By way of illustration, FIG. 4 shows one embodiment of a motor 30 in cross section. The motor comprises a metal armature 31 having slots 32 therein, containing insulated coils 33, surrounded by a metal stator core 34 having slots 35 therein about the inner stator circumference at 36. The stator slots contain insulated coils 37. All the insulation on the coils 33 and 37 can comprise the mica winding tape composites of this invention. FIG. 5 shows one embodiment of a generator 40 in cross section. The generator comprises a metal rotor 41 having field poles 42 therein, containing insulated field windings 43, surrounded by a metal stator 44 having slots 45 therein about the inner stator circumference at 46. The stator slots contain insulated coils 47 and may also contain inner cooling channels not shown. All of the insulation on the windings 43 and coils 47 can comprise the mica winding tape composites of this invention.

Figure 6:
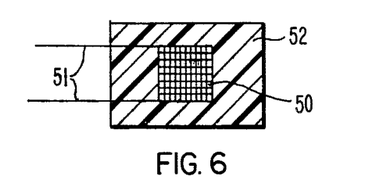
FIG. 6 shows an encapsulated electrical article made in accordance with the instant invention.

FIG. 6 shows an insulated electrical article such as a coil 50 which has leads 51, potted and encapsulated in a cured insulating casting 52 of the resin of this invention. The polyacrylic-epoxy resins of this invention are particularly useful for encapsulating large electrical apparatus such as transformers, since they are highly fluid, having viscosities at 25° C. of between about 1 cps. to about 2,000 cps. Over 2,000 cps. and it will be difficult to impregnate thick mica windings. After encapsulation, the resin can be exposed to a gas effective to deep cure the resin. Thus, run-off of resin from coils can be minimized, to yield insulation having good electrical, shrinkage and thermal stability properties. The resin can also contain up to about 100 parts of filler particles, such as alumina, alumina trihydrate, silica and the like, of average particle sizes from about 10 microns to about 300 microns, per 100 parts of total resin. The electrical properties can then be improved over the 100% acrylic type resins by post-curing the acrylic-epoxy resins for up to about 48 hours at temperatures of up to about 175° C., to provide a complete cure.

The following non-limiting examples are illustrative of various acrylic-epoxy resin formulations and insulating tape composites of this invention.

EXAMPLE 1

An acrylic-epoxy resin was made by first making the epoxy resin component formulation:

EPOXY COMPONENT

An epoxy-styrene solventless resin formulation was prepared. A two component epoxy resin system was first made by mixing 3.25 parts of a solid low melting diglycidyl ether of bisphenol A, having a epoxy equivalent weight of about 475 to 575, a purity of about 99.5%, and a Durran's melting point of about 70° C. to 80° C. (sold commerically by Dow Chemical Company under the Tradename DER-661) with 6.75 parts of a liquid diglycidyl ether of bisphenol A. having an epoxy equivalent weight of about 180 to 200 and a viscosity of between 10,000 to 16,000 cps at 25° C. (sold commercially by Jones-Dabney Company under the Tradename Epi-Rez 510).

The resins were then heated to 90° C. Then, to the 10 parts of combined solid-liquid epoxy resin was added 0.375 part of maleic anhydride of about 99.5% purity and 0.004 part of benzyl dimethyl amine as a catalyst. The catalyzed epoxy-anhydride was held at 90° C. for about 6 hours, during which time it was occasionally stirred, to substantially completely react all of the maleic anhydride, and effect a reaction to the complete epoxy diester stage.

The acid number of the epoxy diester formed was about 2.5, indicating substantially complete reaction, i.e., about 0.1% maleic anhydride left unreacted. This value was determined by using the standard acid test, where 1 gram of the epoxy diester was dissolved in 25 grams of dioxane solvent in a flask. Two drops of phenolphtalein indicator was added to color the solution, which was then titrated to the end point with 0.05 N potassium hydroxide.

Ten parts of styrene aromatic vinyl monomer, to be used as a reactive diluent in the epoxy, was mixed with 0.0067 part parabenzoquinone, to be used as a room temperature reaction stabilizer. The epoxy diester was allowed to cool to about 60° C., and then the styrene-parabenzoquinone mixture was added and stirred in. The inhibited liquid epoxy diester-styrene mixture was allowed to cool to 25° C. The viscosity was measured to be about 200 cps. at 25° C.

To this inhibited epoxy diester-styrene mixture 5.49 parts of NADIC methyl anhydride, 0.048 part of 2,5-dimethyl-2,5 bis(benzoyl peroxy) hexane catalyst (sold by Wallace & Tierman Inc. under the tradename of Luperox 118), and 0.05 part of zinc ethyl hexoate catalyst were added, at 25° C., to provide the solventless epoxy-styrene varnish. The viscosity of the epoxy-styrene resin was measured to be about 200 cps at 25° C.

ACRYLIC COMPONENT

An acrylic component was made as an additive to the epoxy component, and also to be used as a control sample. The acrylic component was made by the simple admixture, at 25° C., of 7.5 parts of tetraethylene glycol diacrylate, 2.5 parts of ethyl methacrylate, 0.04 part of N,N-dimethyl-p-toluidine free radical reaction accelerator, 0.030 part benzoic sulfimide free radical reaction co-accelerator, and 0.008 part hydroquinone free radical stabilizer. These ingredients were constantly stirred to provide a homogeneous, extremely fluid, acrylic resin having a viscosity at 25° C. of 0.5 cps.

When the two components were about to be blended, 0.2 part of cumene hydroperoxide free radical reaction initiator was added to the acrylic component, and then 10 parts of the acrylic component, including the cumene hydroperoxide, was added, with stirring at 25° C., to 10 parts of the epoxy-anhydride component to provide a solventless impregnating composition. The weight ratio, based on 10 parts acrylic, for polyacrylic resin (tetraethylene glycol diacrylate):monoacrylic resin:epoxy resin:aromatic reactive vinyl monomer:anhydride was about 10:3:5:5:3. This composition had a viscosity at 25° C. of about 65 cps. and also had room temperature gas diffusion curing properties. A portion of the acrylic component including the cumene hydroperoxide was kept separate for use as a control sample. Gel times, measuring in glass crystallizing dishes at 25° C., were 1 to 1.5 hours under $N_2$ and 70+ days under air for the all acrylic control sample containing no epoxy and 3 to 4 hours under $N_2$ and 70+ days under air for the sample with 10 parts epoxy resin.

EXAMPLE 2

An acrylic-epoxy resin was made by the same method and using the same ingredients as in EXAMPLE 1, except that the epoxy component contained 19 parts of styrene. The acrylic component was made as in EXAMPLE 1, including the cumene hydroperoxide, added as the last ingredient. After mixing, in a ratio of 10 parts epoxy component:10 parts acrylic component, with stirring at 25° C., a solventless impregnating composition having a viscosity at 25° C. of about 5 cps. was produced which also had room temperature gas diffusion curing properties. The weight ratio for polyacrylic resin (tetraethylene glycol diacrylate) monoacrylic resin:epoxy resin:aromatic vinyl monomer:anhydride was about 10:3:4:7:2. Gel times, measured in glass crystallizing dishes at 25° C., were 5 to 16 hours under $N_2$ and 70+ days under air.

EXAMPLE 3

An acrylic-epoxy resin was made by first making the epoxy resin component formulation:

EPOXY COMPONENT

An epoxy resin, solventless formulation was prepared containing 5.0 parts of a liquid diglycidyl ether of bisphenol A resin, having an epoxy equivalent weight of 172 to 176 and a viscosity at 25° C. of 4,000 to 6,400 cps. (sold commercially by Dow Chemical Company under the Tradename DER 332), 10.5 parts of 1-methyltetrahydrophthalic anhydride, 5.0 parts of neopentyl diglycidyl ether having an epoxy equivalent weight of about 150 and a viscosity at 27° C. of about 4 cps., and 0.008 part of methyltrioctyl phosphonium dimethyl phosphate latent accelerator.

These ingredients were poured into a reaction vessel, stirred at 25° C., and then mixed in a blender for about 5 minutes.

ACRYLIC COMPONENT

The acrylic component was made as in EXAMPLE 1, including the cumene hydroperoxide, added as the last ingredient. After mixing, in a ratio of 10 parts epoxy component:10 parts acrylic component, with stirring at 25° C., a solventless composition, having a viscosity at 25° C. of about 30 cps. was produced, which also had room temperature gas diffusion curing properties. The weight ratio for polyacrylic resin (tetraethylene glycol diacrylate):monoacrylic resin:epoxy resin:aromatic reactive vinyl monomer:anhydride was about 10:3:6:0:7. Gel times, measured in glass crystallizing dishes at 25° C., were 4 to 16 hours under $N_2$ and 50+ days under air.

EXAMPLE 4

An acrylic-epoxy resin was made by the same method and using the same ingredients as in EXAMPLE 3, except that the epoxy component also contained 1.0 part of glycidyl methacrylate vinyl monomer, used as a reactive diluent for the epoxy. The acrylic component was made as in EXAMPLE 1, including the cumene hydroperoxide, added as the last ingredient. After mixing, in a ratio of 10 parts epoxy component:15 parts acrylic component, with stirring at 25° C., a solventless impregnating composition, having a viscosity at 25° C. of about 20 cps. was produced, which also had room temperature gas diffusion curing properties. The weight ratio for polyacrylic resin (tetraethylene glycol diacrylate):monoacrylic resin:epoxy resin:aromatic reactive vinyl monomer:anhydride was about 10:5:5:0:5. Gel times measured in glass crystallizing dishes at 25° C., were 4 to 16 hours under $N_2$ and 6+ days under air. This would represent a low but acceptable pot life in air for the resin system.

EXAMPLE 5

An acrylic-epoxy resin was made by first making the epoxy resin component formulation:

EPOXY COMPONENT

An epoxy resin solventless formulation was prepared containing 7.0 parts of 3,4-epoxy cyclohexylmethyl-3,4-epoxy cyclohexane carboxylate, a cycloaliphatic nonglycidyl ether epoxide having an epoxy equivalent weight of about 133 and a viscosity at 25° C. of 350 to 450 cps. (sold commercially by Union Carbide under the Trade Name ERL 4221), 3.0 parts of neopentyl diglycidyl ether (diglycidyl ether of neopentyl glycol) having a viscosity at 27° C. of about 4 cps., and 0.005 part tribenzyl-tin chloride latent accelerator.

In all cases, the organo-tin compound was first completely dissolved in the neopentyl diglycidyl ether at 25° C. to form a homogeneous admixture. The resulting cycloaliphatic epoxide formulation had viscosities of about 85 cps at 25° C. The sample was poured into a container, stirred at 25° C. and then put in a mixer and mixed for about 15 minutes.

The acrylic component was made as in EXAMPLE 1, including the cumene hydroperoxide added as the last ingredient. After mixing in a ratio of 10 parts epoxy component:10 parts acrylic component, with stirring at 25° C., a solventless impregnating composition, having a viscosity at 25° C. of about 25 cps. was produced, which also had room temperature gas diffusion curing properties. The weight ratio for polyacrylic resin (tetraethylene glycol diacrylate): monoacrylic resin:epoxy resin:aromatic reactive vinyl monomer:anhydride was about 10:3:13:0:0, based on 10 parts polyacrylic resin. Gel times, measured in glass crystallizing dishes at 25° C., were 7 to 16 hours under $N_2$ and 20+ days under air.

Dissipation power factors ($100 \times \tan \delta$) and dielectric constants were measured on Examples 1 through 4 at 25° C. The results of these tests are shown below in Table 1:

TABLE I

| SAMPLE (wt. ratio polyacrylic:monoacrylic:epoxy:aromatic vinyl monomer:anhydride, based on 10 parts polyacrylic | Electrical Properties 25° C. | | | |
|---|---|---|---|---|
| | No Postbake | | Postbaked* | |
| | $100 \times \tan\delta$ | $\epsilon'$ | $100 \times \tan\delta$ | $\epsilon'$ |
| Example 1 (10:3:0:0:0) (control) 10p acrylic component :0p epoxy component | 5.1% | 5.6 | 1.8% | 4.3 |
| Example 1 (10:3:5:5:3) 10p acrylic component :10p epoxy component | 6.0% | 4.9 | 0.4% | 3.4 |
| Example 2 (10:3:4:7:2) 10p acrylic component :10p epoxy component | 7.1% | 5.9 | 0.1% | 3.7 |
| Example 3 (10:3:6:0:7) 10p acrylic component :10p epoxy component | n.m. | n.m. | 0.6% | 3.2 |
| Example 4 (10:5:5:0:5) 15p acrylic component :10p epoxy component | n.m. | n.m. | 0.3% | 3.0 |

*Postbaked 16 hrs. at 150° C.
n.m. = Not Measured

The stability tests, which determine storage time until visual gelling occurs, were carried out on samples of about 50 grams of resin stored in half-filled 4 oz. glass jars or polyethylene containers, so that a large air gap was present. Because of the uncertain effects of the fluorescent lighting in the laboratory on the resin stabilities, the samples were stored in the dark. Periodically, gel times were run under $N_2$ flow on the samples to check for retention of cure reactivity during storage.

The gel time measurements, i.e., time required for visual gelling to occur, were made on 10 gram samples in 2 inch diameter glass, crystallization dishes. It was found that the ordinary laboratory vacuum was insufficient to gel the samples within a reasonable time. However, rapid gelation was achieved by placing the samples in a desiccator and passing nitrogen through the desiccator at a rate of about 13 liters/min. at 25° C.

The power factor ($100 \times \tan \delta$) and dielectric constant data was obtained on conductor insulated mica composites, impregnated with the resin samples, and cured by $N_2$ contact in an oxygen evacuated container. The composites were fabricated by brushing the resins over a polyester-bonded mica tape wrapped 6 layers thick, i.e., 3 wrappings half-lapped, on 0.5 in. outside diameter copper tubes 8 in. long. Because of the very fluid nature of these resins it was observed that rapid and thorough penetration of these mica products occurred.

The samples were gelled in an oxygen evacuated pressure vessel under a stream of $N_2$ at a flow rate of about 13 to 14 liters/min. at 25° C., which was effective to allow $N_2$ contact and displacement of oxygen dissolved in the resin. To analyze the extent of cure of the resins in these composites, it was decided to bake one set of these samples for 16 hours in an oven at 150° C., after the initial room temperature cure. Power factor measurements were recorded at 25° C. As can be seen in Table 1, the power factor and dielectric constant data at 25° C., room temperature cure i.e., no heat cure are good, i.e., below about 20% for power factor and below 6 for dielectric content. The post-curing of the acrylic-epoxy resins improved the power factor and dielectric constant more than post-curing of the 100% acrylic control. It would be expected that there is substantially less shrinkage upon cure in the epoxy containing systems as well as better thermal stability at high temperatures. Mica insulation impregnated with the resin of this invention was also cured by contact with static $N_2$ at between 90 psi. to 100 psi. in an oxygen evacuated pressure chamber.

EXAMPLE 5

Several resin systems were made by the same method as in EXAMPLE 1. Samples 5(a) to 5(d) used the same amounts of the same ingredients as in EXAMPLE 1 to form the inhibited epoxy diester-styrene mixture, except that 12 parts of styrene monomer was used with 0.0068 part of parabenzoquinone reaction inhibitor. To this mixture, 5.49 parts of NADIC methyl anhydride and 0.148 part total catalyst was added, to form the epoxy component.

Sample 5(a) did not contain any polyacrylic or monoacrylic component and acted as a control. The acrylic component for Samples 5(b) to 5(d) contained 7.5 parts of tetraethylene glycol diacrylate, 0.02 part of N,N-dimethyl-p-toluidine, 0.03 part of benzoic sulfimide, 0.2 part of cumene hydroperoxide and no monoacrylic resin. Sample 5(b) contained 5 parts of the acrylic component per 100 parts of the epoxy component and had a weight ratio, based on 10 parts polyacrylic resin, for polyacrylic resin (tetraethylene glycol diacrylate):monoacrylic resin:epoxy resin:aromatic vinyl monomer:anhydride of about 10:0:72:86:42. Sample 5(c) contained 10 parts of the acrylic component per 100 parts of the epoxy component and had a weight ratio, based on 10 parts polyacrylic (tetraethylene glycol diacrylate):monoacrylic resin:epoxy resin:acromatic vinyl monomer:anhydride of about 10:0:36:43:21. Sample 5(d) contained 15 parts of the acrylic component per 100 parts of the epoxy component and had a weight ratio, based on 10 parts polyacrylic (tetraethylene glycol diacrylate):monoacrylic resin:epoxy resin:aromatic vinyl monomer:anhydride of about 10:0:24:28:14.

The samples were placed in an oxygen evacuated pressure vessel under a stream of $N_2$ at a flow rate of about 14 liters/min. at 25° C. Sample 5(a), without the acrylic component, did not gel, showing the criticality of the polyacrylate. Samples 5(b) through 5(d) gelled to provide a room temperature cure. All of the samples were baked in an oven for 16 hours at 150° C. Power factor (100×tan δ) and dielectric constant measurements were taken as described hereinabove and recorded at 150° C. The results are shown below in Table 2:

TABLE 2

| SAMPLE (wt.ratio polyacrylic: monoacrylic:epoxy:aromatic vinyl monomer:anhydride, based on 10 parts polyacrylic) | Electrical Properties 150° C. | |
|---|---|---|
| | 100 × tanδ | $\epsilon'$ |
| Example 5(a) (0:0:36:43:21) (control) 0p acrylic component 100p epoxy component | 9.0% | 4.7 |
| Example 5(b) (10:0:72:86:42) 5p acrylic component 100p epoxy component | 11.0% | 4.8 |
| Example 5(c) (10:0:36:43:21) 10p acrylic component 100p epoxy component | 13.0% | 5.1 |
| Example 5(d) (10:0:24:28:14) 15p acrylic component 100p epoxy component | 18.0% | 5.3 |

TABLE 2-continued

As can be seen, power factor and dielectric constant data are good at the high temperature measured, i.e., 150° C. and almost as good as the all epoxy system, sample 5(a). As the acrylic polymer increases, the power factor and dielectric constant values also increase. Power factor values below 20 are considered good for applications up to about 20 Kv. Power factor values measured at 25° C. would all be below 10%.

We claim:

1. A method of applying cured resinous material to an article, comprising the steps of:
   (A) applying a solventless, insulating resin to an article, the resin containing dissolved oxygen therein and having a viscosity of between about 1 cps. and 2,000 cps. at 25° C., said resin consisting essentially of an admixture of aliphatic polyacrylic resin selected from the group consisting of diacrylates, triacrylates and their mixtures:aliphatic monoacrylic resin:epoxy resin:aromatic reactive vinyl monomer:anhydride in a weight ratio of from 10:0 to 20:0.1 to 100:0 to 120:0 to 60, said insulating resin also containing effective amounts of: organic free radical reaction stabilizer, organic free radical initiator, organic free radical accelerator, and organic co-accelerator, and
   (B) contacting the resin with an inert diffusion gas selected from the group consisting of nitrogen, carbon dioxide, argon, helium, methane, hydrogen and mixtures thereof, in an amount effective to permeate into the resin to displace the dissolved oxygen in the resin to a level below about 0.5 volume % to initiate cure without the application of heat, to provide a deep cured resinous coating on the article without metal contact catalysis.

2. The method of claim 1, wherein the free radical initiator is an organic peroxide, the free radical accelerator is an organic tertiary amine, and the organic co-accelerator is an organic sulfimide.

3. The method of claim 2, wherein the insulating resin contains effective amounts of an organic free radical reaction stabilizer selected from the group consisting of hydroquinone parabenzoquinone, aromatic acidic phenolic compounds and mixtures thereof and includes a latent accelerator.

4. The method of claim 2, wherein the oxygen is displaced from the insulating resin in step (B) by passing an inert gas stream over the resin applied to the article, at a flow rate of between about 6 to about 20 liters/minute.

5. The method of claim 2, wherein the oxygen is displaced from the insulating resin in step (B) by inert gas forced onto the container at a pressure of between about 20 psi to about 150 psi.

6. The method of claim 2, wherein the ratio of aliphatic polyacrylic resin:epoxy resin is in a weight ratio of from 10:4 to 75, and the ratio of aliphatic polyacrylic resin:anhydride is in a weight ratio of from 10:1 to 45.

7. The method of claim 2, wherein the weight ratio of insulating resin:organic free radical reaction stabilizer:organic free radical initiator:organic free radical accelerator:organic co-accelerator is from 100:0.001 to 1:0.001 to 10:0.01 to 10:0.01 to 10, and the article is a conductor covered with mica insulation, and where the conductor in step (A) is placed in a tank which is then evacuated to remove oxygen and the resin is then admitted into the tank under pressure.

8. A mica tape impregnated with an insulating resin by the method of claim 2.

9. An article, comprising a conductor covered with insulation which is impregnated with about 5% to about 35% based on the insulation weight of an insulating resin, by the method of claim 2.

10. An insulated, potted, high voltage electrical transformer, comprising a magnetic core, electrical coil windings disposed about the magnetic core, and a body of cured resinous insulation applied to the electrical coil windings, the insulation comprising a cured insulating resin applied by the method of claim 2.

11. An insulated, high voltage electric motor, comprising a metal stator having slots therein surrounding a metal armature, and conducting electrical coil windings disposed within the slots of the stator, and a body of cured resinous insulation applied to and completely impregnating the electrical coil windings, the insulation comprising a cured insulating resin applied by the method of claim 2.

12. An insulated, high voltage electric generator, comprising a metal stator having slots therein surrounding a metal rotor, and conducting electrical coil windings disposed within the slots of the stator, and a body of cured resinous insulation applied to and completely impregnating the electrical coil windings, the insulating comprising a cured insulating resin applied by the method of claim 2.

13. The method of claim 7, wherein, in step (B), the diffusion gas consists of nitrogen, carbon dioxide or mixtures thereof.

14. An article having cured insulation thereon comprising a cured resinous admixture, said admixture consisting essentially of aliphatic polyacrylic resin selected from the group consisting of diacrylates, triacrylates and their mixtures:aliphatic monoacrylic resin:epoxy resin:aromatic reactive vinyl monomer: anhydride, in a weight ratio of about 10:0 to 20:0.1 to 100:0 to 120:0 to 60 with effective amounts of: organic free radical reaction stabilizer, organic free radical initiator, organic free radical accelerator, and organic co-accelerator, wherein the admixture before cure contained dissolved oxygen therein, said admixture being cured to a solid state in a non-oxygen containing, inert diffusion gas atmosphere, to depths of up to about 6 inches without metal contact catalysis, by contacting the admixture with an amount of an inert diffusion gas effective to cause diffusion gas permeation and displacement of oxygen from the resin to a level below about 0.5 volume % to initiate cure without the application of heat, to provide an insulation after cure at 25° C. having dissipation power factors of below about 10% at 25° C.

15. The insulated article of claim 14, where in the uncured admixture, the free radical initiator is an organic peroxide, the free radical accelerator is an organic tertiary amine, the organic co-accelerator is an organic sulfimide and the organic free radical reaction stabilizer is selected from the group consisting of hydroquinone, parabenzoquinone, aromatic acidic phenolic compounds and mixtures thereof.

16. The insulated article of claim 14 where the weight ratio of insulating admixture:organic free radical reaction stabilizer:organic free radical initiator:organic free radical accelerator:organic co-accelerator in the uncured admixture is from 100:0.001 to 1:0.001 to 10:0.01 to 10:0.01 to 10.

17. The insulated article of claim 14, where the admixture also contains an effective amount of a latent accelerator.

18. A method of applying cured resinous material to an article, comprising the steps of:
(A) applying a solventless, insulating resin to an article, the resin containing dissolved oxygen therein, said resin comprising an admixture of aliphatic polyacrylic resin and epoxy resin in a weight ratio of polyacrylic:epoxy of from 10:0.1 to 100, and
(B) contacting the resin with a non-oxygen containing inert gas in an amount effective to permeate into the resin to displace the dissolved oxygen in the resin to a level below about 0.5 volume % to initiate cure without the application of heat, to provide a cured resinous coating on the article without metal contact catalysis.

* * * * *